US011928710B2

(12) United States Patent
Taylor et al.

(10) Patent No.: US 11,928,710 B2
(45) Date of Patent: Mar. 12, 2024

(54) COMPUTER PLATFORM AND NETWORK FOR ENHANCED SEARCH MANAGEMENT

(71) Applicant: RAKUTEN, INC., Tokyo (JP)

(72) Inventors: Jack Taylor, Boston, MA (US); Keith Thoma, Boston, MA (US)

(73) Assignee: Rakuten, Inc., Tokyo (JP)

( * ) Notice: Subject to any disclaimer, the term of this patent is extended or adjusted under 35 U.S.C. 154(b) by 244 days.

(21) Appl. No.: 17/210,642

(22) Filed: Mar. 24, 2021

(65) Prior Publication Data

US 2022/0309535 A1  Sep. 29, 2022

(51) Int. Cl.
| | |
|---|---|
| *G06Q 30/00* | (2023.01) |
| *G06F 16/9535* | (2019.01) |
| *G06Q 30/0201* | (2023.01) |
| *G06Q 30/0207* | (2023.01) |
| *G06Q 30/0251* | (2023.01) |
| *G06Q 30/0601* | (2023.01) |

(52) U.S. Cl.
CPC ..... *G06Q 30/0256* (2013.01); *G06F 16/9535* (2019.01); *G06Q 30/0201* (2013.01); *G06Q 30/0215* (2013.01); *G06Q 30/0641* (2013.01)

(58) Field of Classification Search
CPC ........... G06Q 30/0256; G06Q 30/0201; G06Q 30/0215; G06Q 30/0641; G06F 16/9535
See application file for complete search history.

(56) References Cited

U.S. PATENT DOCUMENTS

| | | | | |
|---|---|---|---|---|
| 2007/0150345 A1* | 6/2007 | Tonse | ..................... | G06Q 30/02 |
| | | | | 705/14.69 |
| 2007/0168465 A1* | 7/2007 | Toppenberg | ........... | G06Q 50/16 |
| | | | | 709/218 |
| 2008/0071638 A1* | 3/2008 | Wanker | ................... | G06F 17/40 |
| | | | | 705/347 |
| 2009/0063468 A1* | 3/2009 | Berg | ..................... | G06F 16/951 |
| | | | | 707/999.005 |
| 2015/0106360 A1* | 4/2015 | Cao | ........................ | G06Q 10/00 |
| | | | | 707/750 |
| 2015/0120696 A1* | 4/2015 | Blemaster | ........... | G06F 3/04817 |
| | | | | 707/711 |

FOREIGN PATENT DOCUMENTS

| | | |
|---|---|---|
| JP | 2010-211530 A | 9/2010 |
| JP | 2011-238098 A | 11/2011 |
| JP | 2020-161089 A | 10/2020 |

OTHER PUBLICATIONS

J. B. Killoran, "How to Use Search Engine Optimization Techniques to Increase Website Visibility," in IEEE Transactions on Professional Communication, vol. 56, No. 1, pp. 50-66, Mar. 2013, doi: 10.1109/TPC.2012.2237255. (Year: 2013).*

(Continued)

*Primary Examiner* — Sun M Li
(74) *Attorney, Agent, or Firm* — Troutman Pepper Hamilton Sanders LLP

(57) ABSTRACT

A computer implemented search management process and platform include USER data to build libraries of keywords used to associate merchant selections in response to queries seeking merchant products and services.

20 Claims, 6 Drawing Sheets

(56) References Cited

OTHER PUBLICATIONS

Z. Hui, Q. Shigang, L. Jinhua and C. Jianli, "Study on Website Search Engine Optimization," 2012 International Conference on Computer Science and Service System, Nanjing, China, 2012, pp. 930-933, doi: 10.1109/CSSS.2012.236. (Year: 2012).*

J. B. Killoran, "How to Use Search Engine Optimization Techniques to Increase Website Visibility," in IEEE Transactions on Professional Communication, vol. 56, No. 1, pp. 50-66, Mar. 2013, doi: 10.1109/TPC.2012.2237255. (Year: 2012).*

R. Chaudhary and M. Bhusry, "A new contrive to evaluate web page ranking," 2014 International Conference on Electronics and Communication Systems (ICECS), Coimbatore, India, 2014, pp. 1-6, doi: 10.1109/ECS.2014.6892717. (Year: 2014).*

Z. Hui, Q. Shigang, L. Jinhua and C. Jianli, "Study on Website Search Engine Optimization," 2012 International Conference on Computer Science and Service System, Nanjing, China, 2012, pp. 930-933, doi: 10.1109/CSSS.2012.236. (Year: 2012) (Year: 2012).*

Notice of Reasons for Refusal & English translation dated Apr. 4, 2023, from corresponding JP Appl. No. 2021-061493.

\* cited by examiner

COMPUTER PLATFORM AND NETWORK FOR ENHANCED SEARCH MANAGEMENT

FIELD OF INVENTION

The invention herein is directed to novel systems and methods for computer implemented networks to manage transactional communications on e-commerce platforms. More particularly, the present invention provides selectively programmed servers that interact with e-commerce web sites and USER query requests to facilitate search operations.

BACKGROUND

A growing interest in on-line commerce has pushed this new product/service channel to new and spectacular heights in operational capabilities and performance. Improvements in connecting purchasers with merchants has made the e-commerce experience much more efficient and seamless. One particularly successful transaction platform is found with the on-line stores supported by a network allowing multiple merchants to share a common access to a diverse market of consumers with minimal investment in operating facilities. One platform that supports extensive e-commerce transactions is located on-line at Rakuten.com. There are others, but this is representative of the capabilities and issues associated with such multi-merchant facilities.

Notwithstanding the success of these multi-merchant platforms, there are areas of operation that still remain mired in unproductive approaches and slow or incomplete operations. Content curation is the process of finding and sharing great content that is both relevant to your business and valuable to your viewers. Curation is the selection of items such as documents or website URLs to be included as a responsive list or collection. Curation is often facilitated by use of keywords—terms that are digitally matched by association with the target document or responsive site. In a simple, high level view, a keyword is a search term entered by a USER and used by the search tool to locate a target document or site that is specifically sought by the USER.

E-commerce platforms have little control over the use of search terms by USERs but can facilitate effective content curation by appropriate keywords associated with select content. The objective is to associate keywords with content that enhances relevancy in the response and speed in recall. In practice, queries that include keywords are presented with a response that is associated with that keyword. For example, a query that includes the keyword "groceries" would trigger a response "Walmart.com" because "groceries" was a keyword associated with the link to Walmart.com.

In the past, this was often done manually, with keywords selected and updated by staff committed to providing good associative relationships between search and target responses. A manually created library of keywords and queries using these words triggers responses associated with that library.

A problem often arises where manual entry of keywords is used to associate target merchants/products with queries. First and foremost is the time and effort to manually develop and program keywords. The problem is particularly acute for shopping websites that aggregate multiple merchant/stores within a single portal. As the store count grows, the development and programming of keywords becomes very expensive; and as time goes by, these programmed keywords lose their relevancy. Other problems include badly targeted keywords, or terminology that is rarely used to search. Because of human bias, an unbalanced search often occurs within the community of stores at a given portal.

Additional issues often arise. Manual entry may miss relevant keywords or provide keywords that are clearly irrelevant and result in an empty response to a proper inquiry. For example, a USER may enter a query for "DSW"—an acronym for the store: Designer Shoe Warehouse. Without a keyword associated with that store, "DSW" would return zero results—leading to a very dissatisfied USER and merchant.

Another issue is directed to recall. To illustrate, a query may be entered for "iphone"—and the results based on manual entry of keywords may list various outlets for electronics that include iphone components or related services, but fail to bring up Apple Computer retail outlet—a key iphone source—because of its narrower profile and missing or lower priority keyword to iphone.

Other problems arise depending on the nature of the affiliate network and marketplace attributes. For example, marketplace operation may be directed to various incentive programs with participants offering "cash back" or similar incentives to USERs. These incentive programs are constantly changing, altering the relevancy of an association in real time to any incentive searching consumer, lowering recall rate and resulting in a poor user experience and diminished returns to the merchant.

The foregoing problem can be illustrated by using an online retailer such as Walmart.com. If Wallmart.com is offering a current 5% cash back, USERs would be very interested in visiting Walmart.com, and keywords such as "groceries" or "electronics" will thus be used and result in significant hits. With little or no notice, however, Walmart.com can drop the incentive and lose its relevancy while remaining a top response to these queries.

The above and other problems are often encountered with the use of manual keyword entry and its use in building merchant keyword libraries. It was with this understanding of the problems that led to the development of the inventive approach detailed below.

SUMMARY

A novel e-commerce system is provided below that implements a product search query using keywords that are automatically generated by system defined parameters using program-controlled keyword creation algorithms. One aspect of this approach is the unique source data applied in the algorithms that includes user tracking data for an affiliate network or marketplace website. The system is program controlled to extract and detect patterns in USER data and to build a library of keywords for a given target having enhanced relevancy and recall In accordance with various inventive features, the present invention accesses a graph database that collects and organizes USER data based on interaction with the affiliate network and/or marketplace, including the queries used to navigate between merchants. The keyword processor employs a search algorithm to assist in data mining, and pattern recognition for data extracted from the central graph database. Operation can be periodic at set intervals or managed in real time with new libraries of keywords for a given merchant generated in response to select inputs, or changes in select environmental factors.

A further inventive aspect is directed to controlled adjustments to the system generated responses from queries that are triggered by merchant keyword data. Data taken from the USER selection history is applied to develop a multiplier for ranking multiple responses for a given query, where the rank of merchants having a more robust response is amplified in the ranking in comparison to the other merchants associated with that query and keyword.

It is therefore an object of the present invention to reduce the cost of building and maintaining libraries of keywords that facilitate searching for selected merchants in an on-line environment.

It is another object of the present invention to provide a program-controlled searching process and graph database to facilitate the identification and operative management of libraries of keywords connecting USER queries to responsive merchants with optimized programming that increases relevancy and recall.

It is another object of the present invention to continuously track various merchant-based incentive programs and to implement an associative boost multiplier connecting a query to one or more merchants in a selectively enhanced manner.

It is yet another object of the present invention to provide data mining programming to detect trends and insights from USER tracking data directed to queries and responses thereto as stored in a graph database.

A further object of the present invention is to provide computer managed implementation of enhanced searching in support of e-commerce that reduces the bandwidth of communications between and among system servers, merchant portals and USER devices.

The above and other objects of the present invention are realized in a selectively programmed computer system connected to and interacting with an e-commerce web portal supporting the transactions with multiple online stores. The computer system employs a search algorithm on pattern detection to process stored USER data on queries and selections regarding merchants. Search algorithms are well known.

Based on this USER data, the system develops a library of keywords for association with one or more merchants that enhance the relevancy and recall of responses to specific USER queries.

In accordance with the varying aspects of the present invention, the programmed controlled system supports rapid library development and updating as conditions change in the merchant population. For example, as incentives are changed, the use and dynamic weight for select keywords associated with the merchant undergoing alternative incentives will be adjusted in accordance with system parameters and pre-selected criteria.

DETAILED DESCRIPTION

Briefly in overview, at a high level, the present invention implements an algorithmic controlled keyword development process for building custom keyword libraries for participating merchants in an e-commerce web portal. These portals are often known as affiliate networks or marketplaces that bring together multiple merchants utilizing a common framework. USERs participate by entering search objectives or targets in the form of queries. These queries are typically used to identify particularly relevant merchants. A library of keywords is associated with each merchant and, if queried, triggers a response based on the inputted query. In one example, each merchant may be searched by static information such as its name. Each merchant may also be searched by dynamic information such as its keywords. The keywords and/or their boost levels may be adjusted according to changes to cash back rate, among other possibilities. Adjustments of the keywords and/or their boost levels may result in a different search result for the same query.

Figure 1:
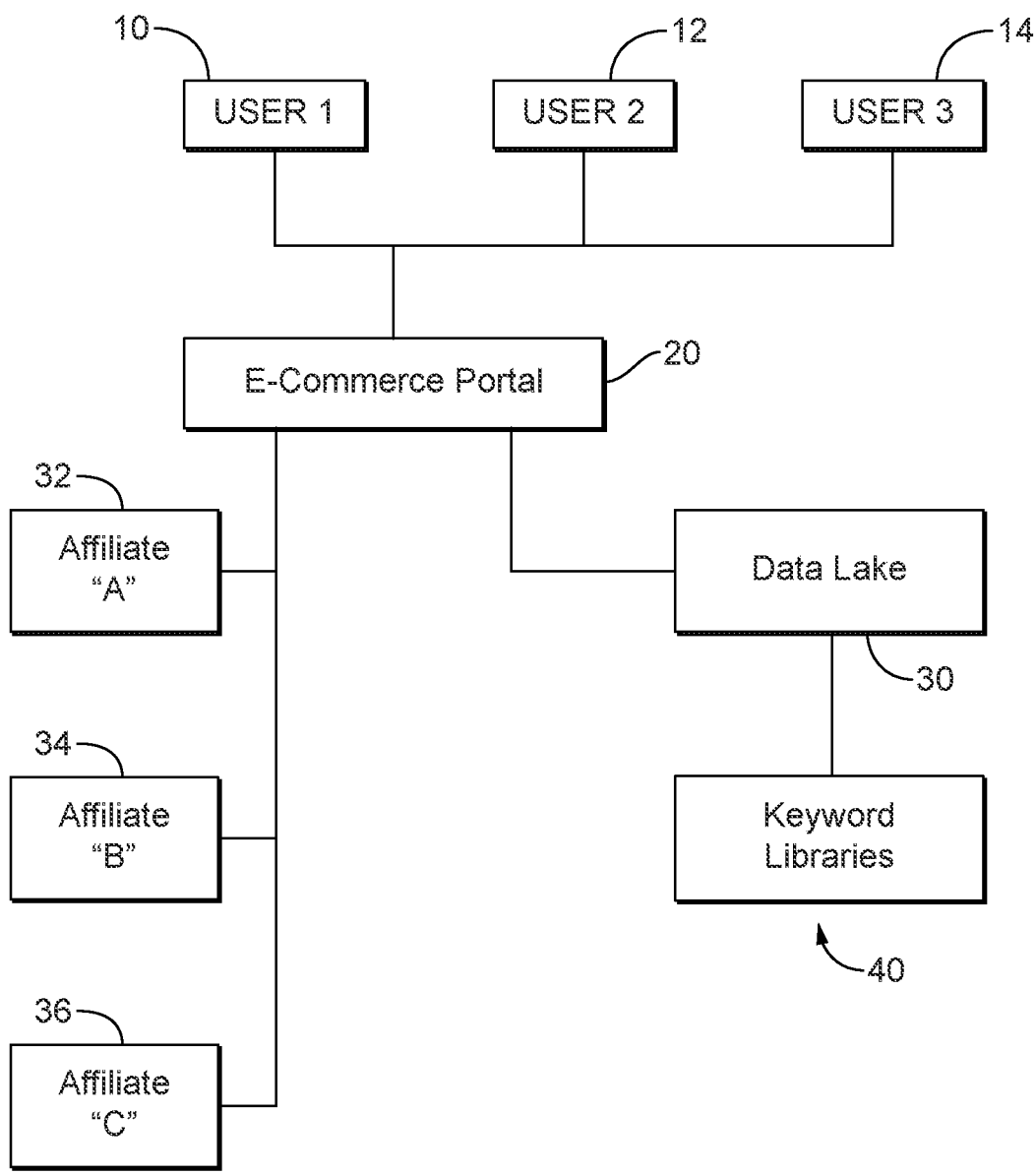
FIG. 1 depicts in functional block form the operative arrangement associated with an e-commerce platform for implementing the features and facilities of the present invention.

Turning now to FIG. 1, a functional block diagram is provided for the e-commerce marketplace system of the present invention. The core of the system is the e-commerce portal 20 that is linked to multiple participants for communications and data collection and transfer. Typically, the portal is connected to the Internet for wide area network access using internet protocols to communicate. Multiple USERs can log on and shop at Portal 20 in accord with the terms of access—and these USERs are typically shoppers using various search terms to facilitate the location of desired goods and services available within the network. In FIG. 1, three USERs 10, 12 and 14 are connected to the Portal 20 via known links (network-based protocols).

Continuing in FIG. 1, Portal 20 is also connected to and in communication with multiple merchants or affiliates 32, 34, 36. To illustrate, three are identified in the Figure as Affiliates A, B and C 32, 34, 36 respectively. These affiliates 32, 34, 36 have sophisticated web business portals of their own, not reflected in the Figure. Illustrative merchant/affiliate portals include Walmart.com, DSW.com, target-.com, wayfair.com—and the like. Portal 20 provides responses to USER queries including links to one or more of these sites that are triggered by the query terms.

A graph database is provided in FIG. 1 included within the data lake 30. In operation, Portal 20 delivers data regarding USERs to the data lake 30, and accesses data within the graph database at the data lake 30 to implement the process of building libraries of keywords 40, for use in selecting search responses.

Figure 2A:
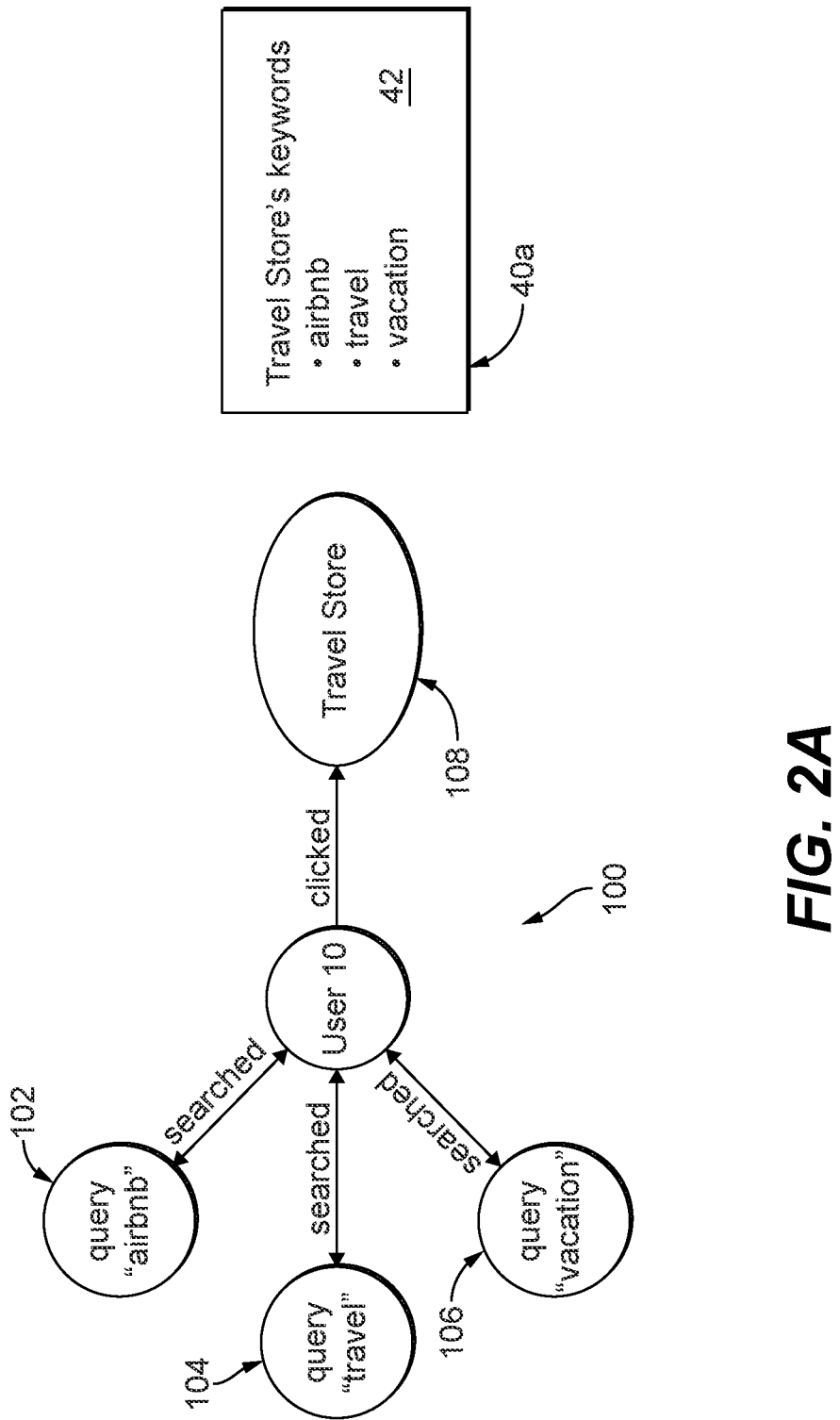
FIG. 2A is an illustrative flow diagram depicting a search process used to develop USER path data to facilitate computer generated keywords.

Next, turning to FIG. 2A, a process flow chart 100 is used to depict the generation of search term relevancy in developing keywords. In the illustration, a single USER 10, 12, 14 is tracked as she enters queries for a travel site. Her first query seeks responses on the query term "airbnb" 102, and triggers a group of responses, none of which are the desired target. The next query is "travel" 104 and this too triggers a group of responses, none of which were the desired target. Finally, the USER enters the query "vacation" 106 with the results including "Expedia" travel site—the target response 108 that she selects The system tracks and stores this sequence and based on this short sequence builds the following keywords for Expedia.com: airbnb, travel and vacation. This now becomes a possible addition to the keyword library 40a for this merchant 32a. This tracking is aggregated for a large population of USERs building a group of libraries of keywords 40 for select merchants. The next USER may seek the merchant "Bookings.com" and during the search enters "Airbnb" as a query. This is repeated, includes results for VRBO. This activity is recorded and stored in the graph database 30, building multiple libraries 40 for various travel web sites 32, 34, 36. As the data grows, the database becomes more robust and useful for the purposes of this invention.

Table 1 illustrates a simple relationship table between the keyword 42, the merchant or store 32, the query-store clickthrough rate ("CTR"—in this case defined as the ratio: (Total clicks on merchant×after searching "keyword")/(Total times "keyword" is searched")) values and the Boost Level. The CTR is a simple metric measuring the percentage of users querying for a certain keyword that then click on a specific store. The third column below provides these CTR values that reflect the frequency in the data where a particular store was the target from a select search query. The CTR is expressed in percentage terms of searches that end up at the particularly listed merchant. The values are used to develop weighting for the level of association for each keyword viz. its respective merchant. The weighting is indicated by a Boost Level as listed in column 4 of Table 1. These boost values are used to rank the results list of responses presented to the USER. The merchant with the larger boost can be ranked above the other competing merchants that are associated with the same keyword.

TABLE 1

| Keyword | Store | Query-Store CTR | Boost level |
|---|---|---|---|
| "airbnb" | Expedia | 40% | 2 |
| "airbnb" | Booking.com | 30% | 1 |
| "airbnb" | VRBO | 15% | 0 |

In the above table, the query 102 on the keyword 42 "airbnb" can return each of the listed stores 32, 34, 36 in column 2 and these can be listed in the order dictated by the boost level.

The development of boost values with the keyword libraries 42 provide a valuable tool to better articulate search results consistent with marketplace and USER objectives. This allows for paid media in search on both global and targeted user group levels, increasing the value of an affiliate marketplace/e-commerce portal 20 for the partnered merchants/affiliates 32, 34, 36. Merchants 32, 34, 36 with lower boosts or other factors that cause them to be exposed less for certain keywords can be targeted and incentivized to pay to increase their position in the in the responses for said keywords 42. The ability of the present invention to ingest multiple signals like user activity, incentive rates, group specific value can be naturally expanded to allow for this. This allows for the creation of competition among the websites and merchants to pay to receive a higher placement in the results displayed to USERs 10, 12, 13 while allowing the present invention to draw the final conclusion on what is most valuable for users 10, 12, 14. By using boost levels, the merchants 32, 34, 36 have a better understanding of why they fell where they did in the rankings. This then allows the merchants 32, 34, 36 to make informed decisions on how and when to provide incentives. In one example, this can be differentiated from a machine learning process, where the process to the get to a certain result is sometimes lost in the learning algorithm.

One of these objectives is the expanded use of incentives in driving demand for merchants in the marketplace. The boost value can be adjusted to enhance the response frequency for keywords that are associated with select merchants concurrently offering meaningful cash back or similar incentives to the USER population.

Figure 2B:
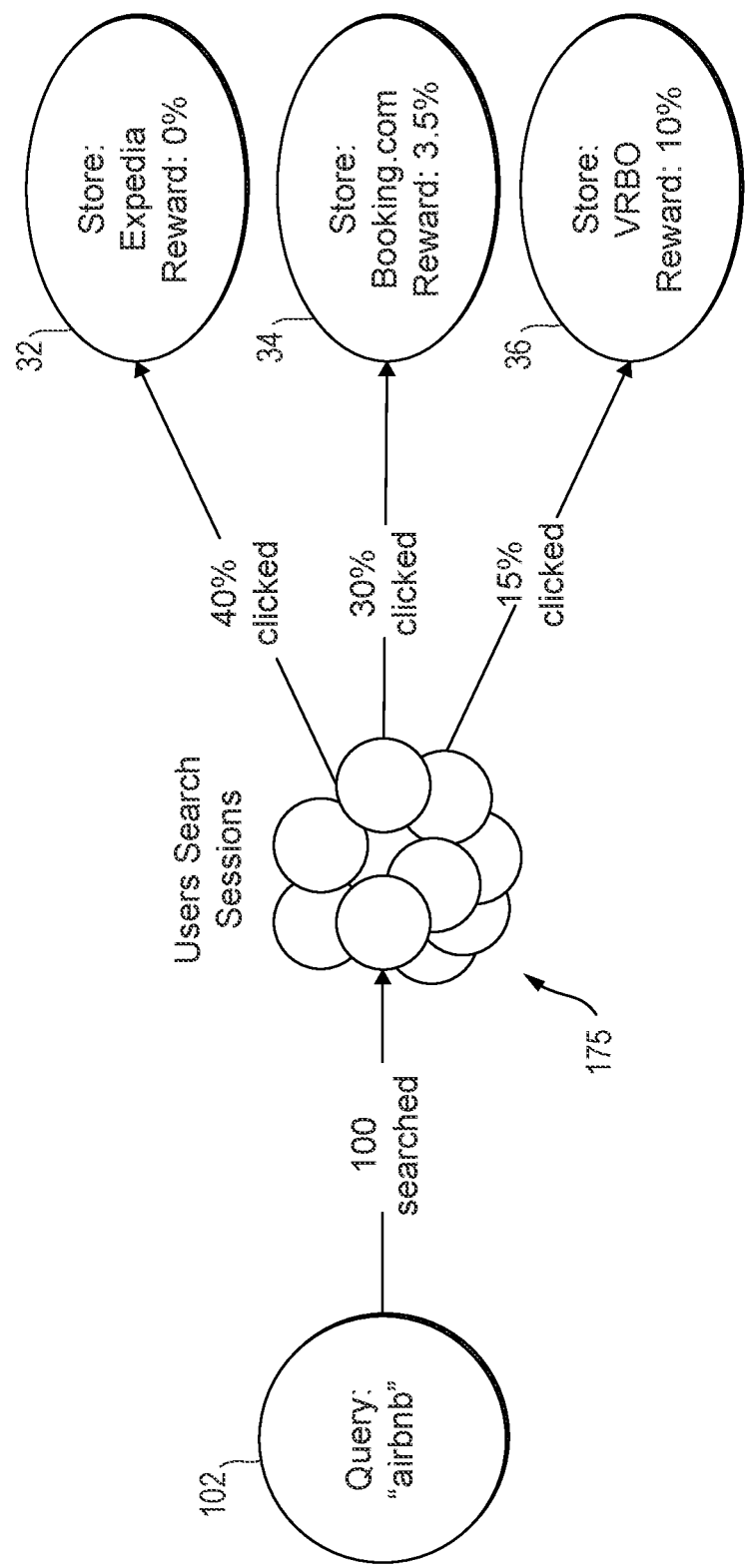
FIG. 2B is an illustrative flow diagram depicting an aggregated results path for the same search query term.

The aggregation of the search data across the USER population is depicted in FIG. 2B with system tracking and storing USER search queries and target web site. The aggregated search query "airbnb" 102 from many USERs 175 and its results are processed and stored (eg 100 values) with 40 going to Expedia, 30 to Bookings.com; and 15 going to VRBO.

The incentive-based boost for keyword response frequency is reflected in Table 2 below directed to a cash back incentive plan. Booking.com is running a cash back incentive plan, that provides more value for all USERs 10, 12, 14. Due to the higher value of Booking.com to users, while second in response frequency, it can be listed in the response ranking above Expedia.com because of the generous incentives it currently is offering. These values are dynamic and can be adjusted in real time as the circumstances dictate. The incentive adjusted boosts is one of many possible criteria that can be used to adjust response priority based on the keyword library.

TABLE 2

| FIG. 2B - Input | FIG.2B - Result |
|---|---|
| 10k User search sessions | Search Results for query "airbnb": Only |
| •100 users searched "airbnb | using click data |
| | 1. Expedia (boost = 2) |
| | 2. Booking.com (boost = 1) |
| | 3. VRBO (boost = 0) |
| | Search Results for query "airbnb": With Boost integration weighting higher than clicks |
| | 1. VRBO (boost = 2) |
| | 2. Booking.com (boost = 1) |

The foregoing data aggregation is processed using select criteria governing incentive programs and builds the boost values and enhanced recall for select merchants in accordance with the incentive-based boosting of association between the keyword and the query. Table 3 provides the search results and the resulting boosts based on incentive programs in place with each merchant and results are summarized in Table 3 below developed by the process of FIG. 2B. Because the store Expedia.com does not currently offer value or incentives to users, it will not be promoted in the response.

TABLE 3

| Keyword | Store | Cash Back | Query-Store CTR | Boost level |
|---|---|---|---|---|
| "airbnb" | Expedia | 0% | 40% | 0 |
| "airbnb" | Booking.com | 3.5% | 30% | 1 |
| "airbnb" | VRBO | 10% | 15% | 0 |

Figure 3:
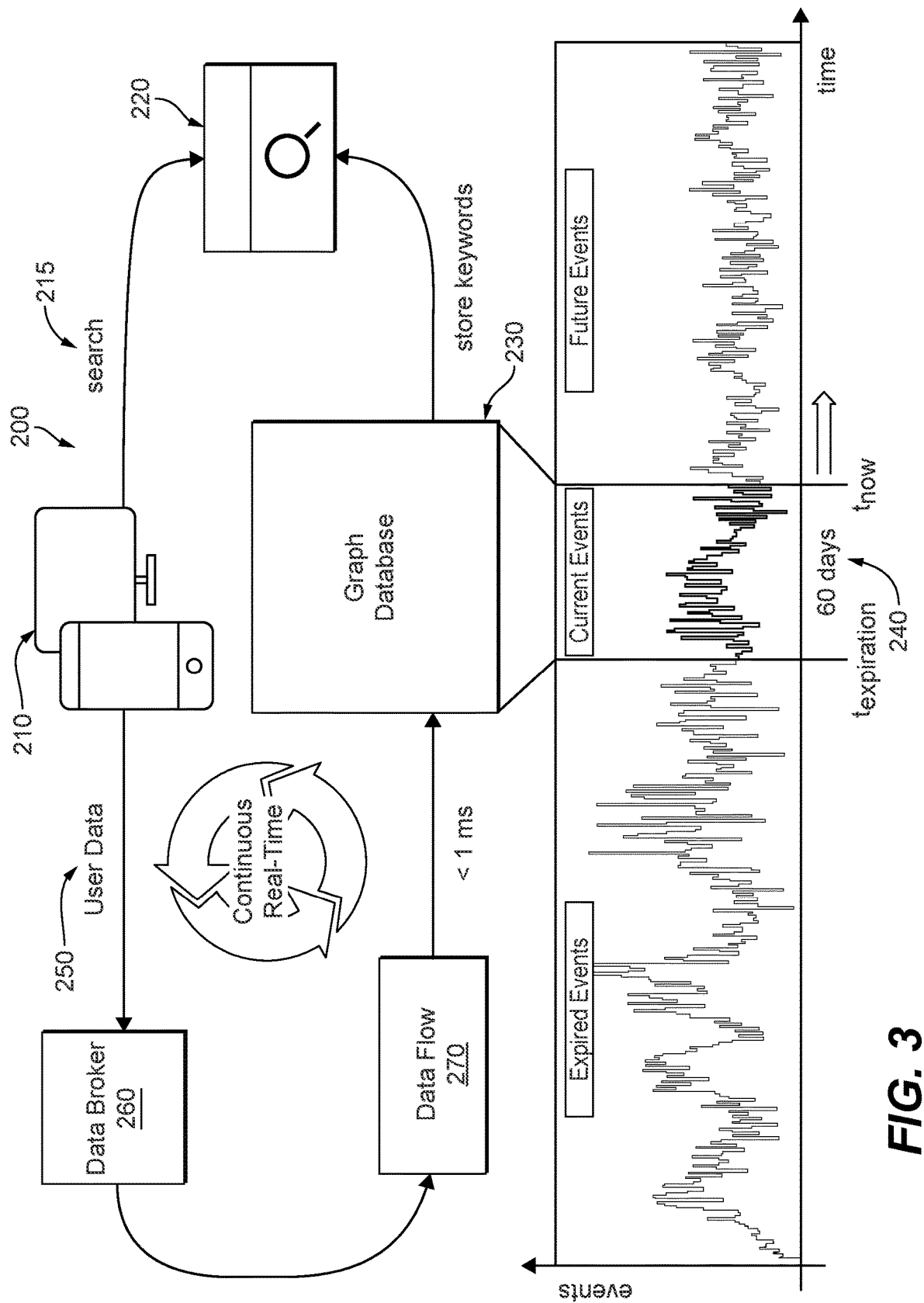
FIG. 3 is an illustrative flow diagram for depicting information flow within the e-commerce platform for implementing the present invention.

Now turning to FIG. 3 a high-level flow diagram depicts the keyword build and concurrent search process 200 in near continuous real-time operation in the data lake 30. Input device 210 can access the marketplace portal 20 and is typically a desktop/laptop computer or smart device. Moving clockwise, USER 10, 12, 14 enters a search query 215 into the device 210 which is processed by applying the search algorithm 220. The keyword/merchant library 40 is organized and stored in a graph database/data lake 230 with time stamps as the search events focus on current window (e.g. 60 days). This window 240 can be set manually, or the algorithm can update as it determines peaks and valleys or relevant usage. The window 240 causes a parsing of the data into future events, which can be predicted trends, and expired events.

Flowing counter-clockwise, USER data 250 is also directed to a real time data broker 260 to assembler and disparate data 250 about the USER 10, 12, 14 and streamlines it to be processed through a data flow tool 270 and stored within the graph database 230—all in real-time. This path, counterclockwise, includes the manual entry of keywords to supplement the library 40. Manual entry of keywords is often demanded for merchants 32, 34, 36 that fall out of the criteria (see infra on incentive-based boosts) but remains important to achieve a relevant response in any event. An example is the keyword Walmart—the company name. In practice merchant names and related aliases are always included in the merchant keyword library. This assures that a targeted search for that particular merchant provides the merchant in the response list.

A third variable in building criteria that dictate response ranking is based on USER specific incentive targeting. Incentives for select stores can be altered based on the USER and/or group making the query. This applies for example USER demographic information to adjust the boost level in the keyword library for a given merchant. In addition to boost adjustment, the library of keywords can be adjusted/modified depending on USER information. In contrast to the graph data above for store incentive boost, the graph can include the concept of user groups and keyword/store combinations that should be preferentially exposed to that USER group—and only that group in some instances.

Figure 4A:
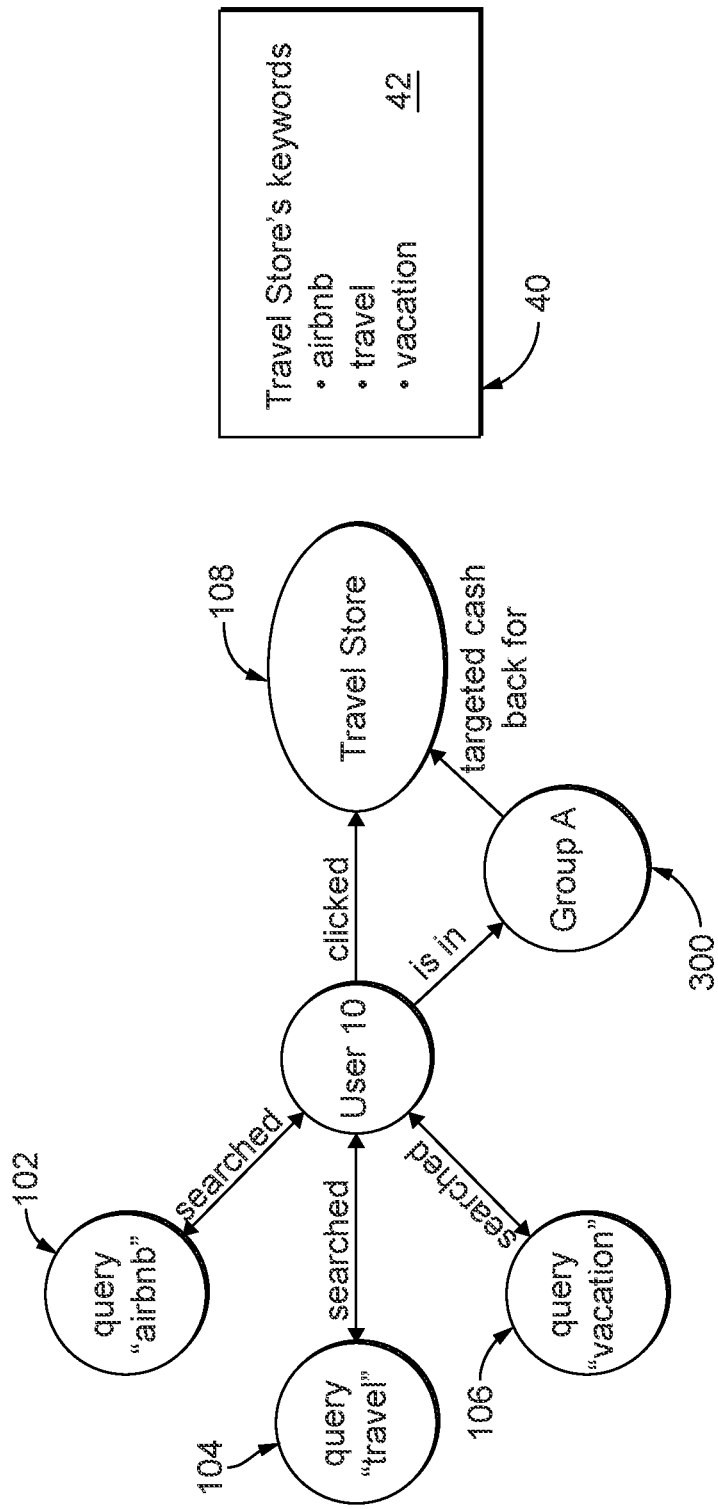
FIG. 4A is an illustrative flow diagram depicting a search process for implementation on the present invention.

The USER group centric approach is depicted in FIG. 4A. Here, the USER 10 queries 102, 104, 106 as before, starting airbnb; followed by travel and vacation with a click through to a selected response/travel store 108. In this instance, a USER subset 300 "Group A" is to receive an enhanced incentive of 3% cash back.

Figure 4B:
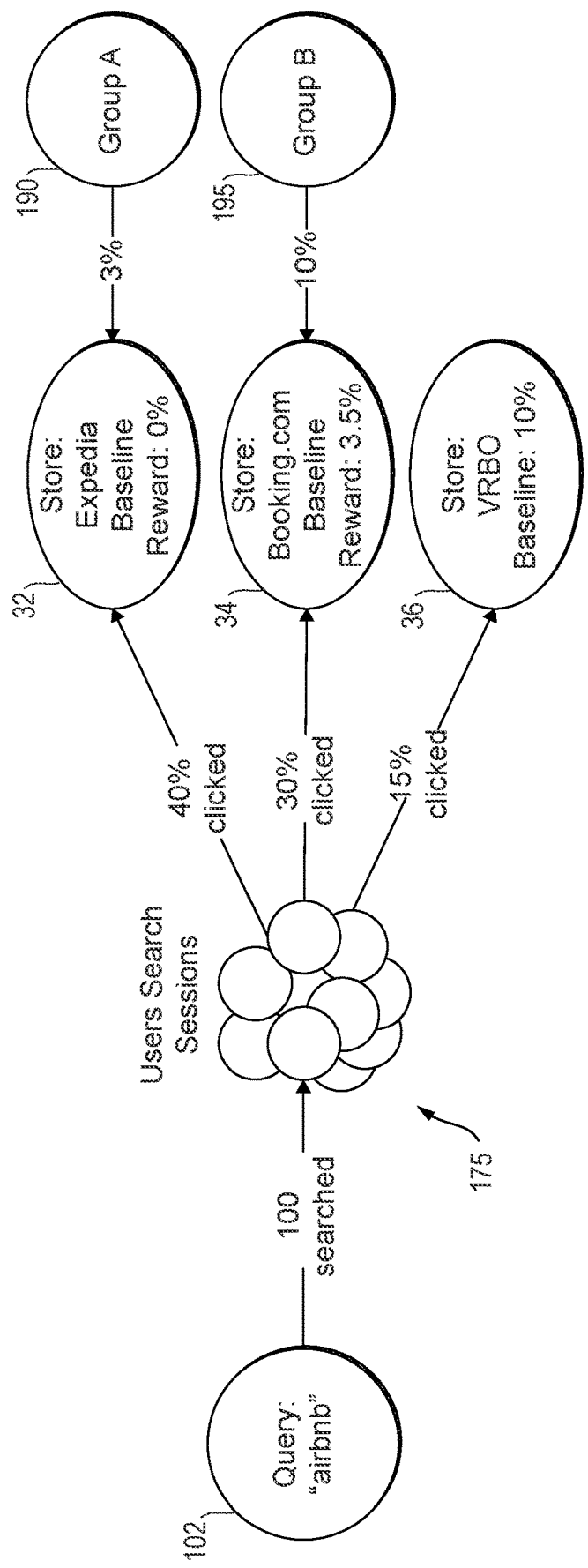
FIG. 4B is an illustrative flow diagram depicting the results path for aggregated use of the same search query term.

Turning now to FIG. 4B, the search term "airbnb" is repeatedly queried 102 and aggregated for many USERs 175 and used to build a profile of responses associated with that key term. Here, in addition to the incentive levels and potential boost adjustments based on these per the incentive rules, a second variable based on the USER group 190, 195 is applied altering the incentive level (3% for Group A and 10% for Group B).

The aggregated results are summarized in Table 4 below with criteria generated boost levels based on incentive and Group programs.

TABLE 4

| FIG. 4B-Input | FIG. 4B - Result |
|---|---|
| 10k User search sessions | Search Results for query "airbnb": Baseline User |
| •100 users searched "airbnb" | 1. Expedia (boost = 2)<br>2. Booking.com (boost = 1)<br>3. VRBO (boost = 0)<br>Search Results for query "airbnb": Group A User<br>1. Expedia (boost = 2.5)<br>2. Booking.com (boost = 1)<br>3. VRBO (boost = 0) |

TABLE 4-continued

| FIG. 4B-Input | FIG. 4B - Result |
|---|---|
| 10k User search sessions | Search Results for query "airbnb": Baseline User |
| | Search Results for query "airbnb": Group B User<br>1. Booking.com (boost = 3)<br>2. Expedia (boost = 2)<br>3. VRBO (boost = 0) |

The queries/responses are aggregated with the ranking optionally governed by this USER based criterion, and boost levels adjusted to increase the merchant exposure to the targeted USER group 300—Group A. This is reflected in the data of Table 5 below.

TABLE 5

| Keyword | Store | Group Type | Cash Back Rate | Boost level |
|---|---|---|---|---|
| "airbnb" | Expedia | Group A | 3% | 2.5 |
| "airbnb" | | Baseline | 2% | 2 |
| "airbnb" | Booking.com | Group B | 10% | 3 |
| "airbnb" | | Baseline | 3.5% | 1 |
| "airbnb" | VRBO | Baseline | 10% | 0 |

Applying Table 5, a USER with no promotional affiliation searching "Airbnb" can see Expedia (Baseline Boost Level 2); Booking.com (Baseline Boost Level 1); and then VRBO (Baseline Boost Level 0) listed in that preferential order. A USER in Group B, on the other hand, sees the order Booking.com (Group B Boost Level 3); Expedia (Baseline Boost Level 2); and then VRBO (Baseline Boost Level 0). A USER in Group A can receive slightly different results than Group B having a list order of Expedia (Group A Boost Level 2.5)

Booking.com (Baseline Boost Level 1); and then VRBO (Baseline Boost Level 0). As one can see, a Group B USER sees Booking.com before Expedia; given the a slightly different boost for that group.

Variations of this arrangement can be dictated by a number of factors include the size and diversity of the marketplace and its associated USER population. The use of criteria in generating keywords for the merchant library helps achieve additional targeted objectives and operational efficiencies. For example, when the incentive applied by the merchant is less than or equal to a predetermined value, searches by the USER do not return results that include that or other merchants with incentives at or below the predetermined incentive rate. Through this, bandwidth and data rates for system communications will drop and improve search responsiveness and operational efficiency.

An illustrative example of the foregoing invention is implemented on the Rakuten.com rewards web portal. Comparisons of its use in practice reflect significant improvements in relevancy and recall in comparison to operational keywords using manual entry only library creation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for generating a library of keywords based on user queries, comprising:
   a non-transitory computer-readable medium configured to store a plurality of libraries of keywords for a plurality of merchant websites, each library of keywords being associated with one of the merchant websites; and
   a processor configured to:
      receive one or more first queries entered by a first user at a search website, the search website being affiliated with the plurality of merchant websites;
      identify at least one first merchant website, from the plurality of merchant websites stored in the non-transitory computer-readable medium, in response to the one or more first queries entered by the first user, wherein the library of keywords associated with the identified at least one first merchant website contains at least one keyword associated with the one or more first queries entered by the first user;
      display a list of first merchant websites to the first user in response to the one or more first queries entered by the first user, the list of first merchant websites including the identified at least one first merchant website;
      determine whether the first user selects the at least one first merchant website in the list of first merchant websites;
      iteratively and continuously calculate, in real time, a respective percentage of users of a plurality of users that select each of the plurality of merchant websites when querying for a first keyword, the plurality of users comprising the first user;
      iteratively and dynamically rank, in real time, each of the plurality of merchant websites based on the calculated respective percentage;
      iteratively and continuously determine, in real time, one or more incentives currently provided by each of the plurality of merchant websites;
      iteratively and dynamically assign, in real time, a respective factor to each of the plurality of merchant websites based on the one or more incentives;
      iteratively and continuously adjust, in real time, the dynamic ranking based on the respective factor;
      iteratively and dynamically generate, in real time, a plurality of keywords for the at least one first merchant website based on the adjusted dynamic ranking;
      iteratively and dynamically add, in real time, the generated keywords to the library of keywords associated with the at least one first merchant website to generate an updated library of keywords;
      receive one or more second queries entered by a second user at the search website;
      identify at least one second merchant website, from the plurality of merchant websites stored in the non-transitory computer-readable medium, in response to the one or more second queries entered by the second user and based on the updated library of keywords; and
      display a list of second merchant websites, different from the list of first merchant websites, to the second user in response to the one or more second queries entered by the second user and based on the updated library of keywords, the list of second merchant websites including the identified at least one second merchant website.

2. The system of claim 1, wherein the non-transitory computer-readable medium is a graph database configured to store time stamps associated with each of the keywords of each library of keywords.

3. The system of claim 2, wherein the processor is configured to track the time stamps associated with each of the one or more first and second queries, and parse the one or more first and second queries into current events, future events and expired events.

4. The system of claim 1, wherein the one or more first and second queries are respective used by the first and second user to navigate among the plurality of merchant websites.

5. The system of claim 1, wherein the processor is configured to detect a pattern in the library of keywords associated with each merchant website.

6. The system of claim 1, wherein the processor is configured to generate the library of keywords for each merchant website based on a sequence of queries and a selection history of a plurality of users.

7. The system of claim 1, wherein the respective factor comprises a boost level determined based on an association between the first keyword and one or more user queries corresponding to the first keyword.

8. A computer implemented search system configured to support a marketplace comprising a plurality of merchant websites and accessible by multiple users seeking commerce with one or more of the plurality of merchant websites, said system comprising:
   a user input collection system connected to a plurality of user input devices and configured to receive entry of user queries comprising terms targeted at returning search results of select merchant websites into said system as user tracking data; and
   a processor configured to:
      iteratively, for each user:
         receive said user tracking data including the user queries and selected merchants;
         store the user queries and the selected merchants in a graph database organized to dynamically track and associate, in real time, the user queries with merchants selected by the multiple users during a query session;
         respond to the user queries by associating each query with one or more merchant websites of the plurality of merchant websites having a matching keyword stored in a respective merchant keyword library by:
            continuously calculating, in real time, a respective percentage of users of the multiple users that select a first merchant website when querying for a first keyword;
            dynamically ranking, in real time, each of the one or more merchant websites based on the calculated respective percentage;
            continuously determining, in real time, one or more incentives currently provided by each of the one or more merchant websites;
            dynamically assigning, in real time, a respective factor to each of the one or more merchant websites based on the one or more incentives;
            continuously adjusting, in real time, the dynamic ranking based on the respective factor;

dynamically generating, in real time, a ranked listing of merchant websites with matching keywords within their respective libraries based on the adjusted dynamic ranking;

dynamically displaying, in real time, the ranked listing of merchant websites; and dynamically updating, in real time, the respective merchant keyword library based on the adjusted dynamic ranking and by applying the user tracking data to generate an updated respective merchant keyword library.

9. The system of claim 8, wherein the processor is configured to adjust a boost level to increase exposure of each merchant website depending on incentives offered to users by each merchant website.

10. The system of claim 9, wherein the processor is configured to adjust the boost level to enhance a response ranking for the keywords that are associated with select merchants concurrently offering an incentive meeting a threshold level for users within a select user group.

11. The system of claim 10, wherein the incentive includes a cash back incentive plan.

12. The system of claim 9, wherein the processor is configured to adjust the boost level based on user demographic information.

13. The system of claim 8, wherein the processor is configured to exclude merchant websites from a query response where that merchant fails to meet a pre-set incentive level.

14. The system of claim 8, wherein the processor is configured to maintain merchant names in said respective merchant keyword library independent of the user tracking data.

15. A method for generating a library of keywords based on user queries, comprising:

storing, by a non-transitory computer-readable medium, a plurality of libraries of keywords for a plurality of merchant websites, each library of keywords being associated with one of the merchant websites;

receiving, by a processor, one or more first queries entered by a first user at a search website, the search website being affiliated with the plurality of merchant websites;

displaying, by the processor, a list of first merchant websites to the first user in response to each of the one or more first queries entered by the first user, the list of first merchant websites including at least one first merchant website affiliated with the search website;

determining, by the processor, whether the first user selects the at least one first merchant website in the list of first merchant websites;

iteratively and continuously calculating, in real time, a respective percentage of users of a plurality of users that select each of the plurality of merchant websites when querying for a first keyword, the plurality of users comprising the first user;

iteratively and dynamically ranking, in real time, each of the plurality of merchant websites based on the calculated respective percentage;

iteratively and continuously determining, in real time, one or more incentives currently provided by each of the plurality of merchant websites;

iteratively and dynamically assigning, in real time, a respective factor to each of the plurality of merchant websites based on the one or more incentives;

iteratively and continuously adjusting, in real time, the dynamic ranking based on the respective factor;

iteratively and dynamically generating, by the processor in real time, a plurality of keywords for the at least one first merchant website based on the adjusted dynamic ranking;

iteratively and dynamically adding, by the processor in real time, the generated keywords to the library of keywords associated with the at least one first merchant website to generate an updated library of keywords;

receiving one or more second queries entered by a second user at the search website;

identifying at least one second merchant website, from the plurality of merchant websites stored in the non-transitory computer-readable medium, in response to the one or more second queries entered by the second user and based on the updated library of keywords; and displaying a list of second merchant websites, different from the list of first merchant websites, to the second user in response to the one or more second queries entered by the second user and based on the updated library of keywords, the list of second merchant websites including the identified at least one second merchant website.

16. The method of claim 15, further comprising adjusting a boost level to increase exposure of each merchant website for each group of users.

17. The method of claim 16, further comprising adjusting the boost level to enhance a response frequency for the keywords that are associated with select merchants concurrently offering an incentive.

18. The method of claim 16, further comprising adjusting the boost level based on user demographic information in the library of keywords for a select merchant.

19. The method of claim 16, further comprising generating a multiplier for ranking multiple results for each query.

20. The method of claim 16, further comprising generating response ranking based on user incentive targeting.

\* \* \* \* \*